United States Patent
Ramappa et al.

(10) Patent No.: US 10,517,048 B2
(45) Date of Patent: Dec. 24, 2019

(54) DEVICE AND METHOD FOR CONTROLLING A BLUETOOTH LOW ENERGY (BLE) ADVERTISER

(71) Applicant: AVAGO TECHNOLOGIES INTERNATIONAL SALES PTE. LIMITED

(72) Inventors: Raghavendra Ramappa, Bangalore (IN); Amrit Swarup Devulapalli, Bangalore (IN); Ravi Nagarajan, Bangalore (IN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 313 days.

(21) Appl. No.: 15/193,477

(22) Filed: Jun. 27, 2016

(65) Prior Publication Data

US 2017/0374629 A1 Dec. 28, 2017

(51) Int. Cl.
| | |
|---|---|
| *H04W 4/80* | (2018.01) |
| *H04W 8/00* | (2009.01) |
| *H04W 4/021* | (2018.01) |
| *H04W 52/28* | (2009.01) |
| *H04W 4/02* | (2018.01) |

(52) U.S. Cl.
CPC ......... *H04W 52/283* (2013.01); *H04W 4/021* (2013.01); *H04W 4/80* (2018.02); *H04W 8/005* (2013.01)

(58) Field of Classification Search
None
See application file for complete search history.

(56) References Cited

U.S. PATENT DOCUMENTS

| | | | | |
|---|---|---|---|---|
| 6,512,935 | B1 * | 1/2003 | Redi | H04W 52/0254 370/252 |
| 8,509,764 | B2 * | 8/2013 | McNew | H04B 17/309 455/431 |
| 8,670,325 | B1 * | 3/2014 | Hui | H04L 45/121 370/238 |
| 9,479,892 | B2 * | 10/2016 | Knaappila | H04W 4/008 |
| 2003/0128690 | A1 * | 7/2003 | Elliott | H04W 8/005 370/351 |
| 2004/0248603 | A1 * | 12/2004 | Canoy | H04W 28/22 455/513 |
| 2005/0143145 | A1 * | 6/2005 | Maekawa | G06F 1/3209 455/574 |
| 2005/0201351 | A1 * | 9/2005 | Nakao | H04L 1/0002 370/342 |
| 2005/0222764 | A1 * | 10/2005 | Uyeki | G01C 21/3415 701/414 |

(Continued)

*Primary Examiner* — Ayaz R Sheikh
*Assistant Examiner* — Tarell A Hampton
(74) *Attorney, Agent, or Firm* — Xsensus LLP (57) ABSTRACT

A device includes circuitry configured to transmit advertisement data to one or more electronic devices at a first advertisement rate. A presence or absence of the electronic devices is detected within communication range of the device based on a detection signal received from at least one of the one or more electronic devices. A predetermined advertisement rate is modified to correspond to a second advertisement rate based on the presence or absence of the one or more electronic devices.

20 Claims, 9 Drawing Sheets

(56) References Cited

U.S. PATENT DOCUMENTS

| | | | | |
|---|---|---|---|---|
| 2006/0172701 A1* | 8/2006 | Kienhoefer | H04W 84/18 | 455/41.2 |
| 2009/0080497 A1* | 3/2009 | Wang | H04B 1/7143 | 375/132 |
| 2009/0296674 A1* | 12/2009 | Ekl | H04W 8/005 | 370/338 |
| 2010/0135267 A1* | 6/2010 | Strutt | H04W 48/12 | 370/338 |
| 2010/0302102 A1* | 12/2010 | Desai | G01S 3/50 | 342/417 |
| 2011/0021142 A1* | 1/2011 | Desai | H04W 8/005 | 455/41.2 |
| 2011/0205969 A1* | 8/2011 | Ahmad | H04W 16/28 | 370/328 |
| 2013/0282263 A1* | 10/2013 | Tee | H04W 40/28 | 701/118 |
| 2013/0287010 A1* | 10/2013 | Chen | H04W 48/10 | 370/338 |
| 2014/0073262 A1* | 3/2014 | Gutierrez | H04M 1/7253 | 455/67.11 |
| 2014/0112222 A1* | 4/2014 | Park | H04W 4/08 | 370/311 |
| 2014/0133375 A1* | 5/2014 | McDiarmid | H04W 52/0229 | 370/311 |
| 2014/0135042 A1* | 5/2014 | Buchheim | G01S 1/68 | 455/456.6 |
| 2014/0169599 A1* | 6/2014 | Solum | H04R 25/554 | 381/315 |
| 2014/0349698 A1* | 11/2014 | Burks | H04W 52/383 | 455/518 |
| 2014/0370917 A1* | 12/2014 | Buchheim | H04W 4/026 | 455/456.1 |
| 2015/0065047 A1* | 3/2015 | Wu | A61N 1/37252 | 455/41.2 |
| 2015/0195100 A1* | 7/2015 | Imes | H04L 12/282 | 455/420 |
| 2015/0230285 A1* | 8/2015 | Park | H04W 76/028 | 455/41.2 |
| 2015/0339655 A1* | 11/2015 | Basheerahammed | G06Q 30/06 | 705/14.64 |
| 2015/0382304 A1* | 12/2015 | Park | H04W 52/0248 | 455/41.2 |
| 2016/0007289 A1* | 1/2016 | Weizman | H04W 52/0229 | 370/311 |
| 2016/0078738 A1* | 3/2016 | Basalamah | G06K 7/10366 | 340/8.1 |
| 2016/0105788 A1* | 4/2016 | Helms | H04W 8/005 | 455/41.2 |
| 2016/0241728 A1* | 8/2016 | Naruse | H04N 1/00347 | |
| 2016/0242264 A1* | 8/2016 | Pakkala | H05B 37/0272 | |
| 2016/0255704 A1* | 9/2016 | Mueller | H04W 80/02 | 315/307 |
| 2016/0260301 A1* | 9/2016 | Miller | G08B 13/2417 | |
| 2016/0286543 A1* | 9/2016 | Putterman | H04W 76/021 | |
| 2016/0381579 A1* | 12/2016 | Li | G01S 1/00 | 370/252 |

* cited by examiner

DEVICE AND METHOD FOR CONTROLLING A BLUETOOTH LOW ENERGY (BLE) ADVERTISER

BACKGROUND

Technical Field

The present disclosure is directed to controlling a Bluetooth Low Energy (BLE) advertising device.

Description of the Related Art

BLE advertising beacons transmit small amounts of advertising data and include coin cell-sized batteries that are designed to operate for many years and can be configured to transmit the advertising data to another device configured for BLE communications, such as a mobile phones. For example, BLE advertisers can include beacons in a shopping mall that transmit store advertisements, pet tags that transmit a GPS location of a pet, wearable devices that transmit a location to a host electronic device, and the like. The BLE advertising beacons transmit the advertising data at a periodic time interval without knowledge of scanner availability in the vicinity of the advertising beacon or whether there is even a necessity to transmit the data.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

In an exemplary implementation, a device includes circuitry configured to transmit advertisement data to one or more electronic devices at a first advertisement rate. A presence or absence of the electronic devices is detected within communication range of the device based on a detection signal received from at least one of the one or more electronic devices. A predetermined advertisement rate is modified to correspond to a second advertisement rate based on the presence or absence of the one or more electronic devices.

In another exemplary implementation, a process includes transmitting, via a first device with circuitry, advertisement data to one or more electronic devices at an advertisement rate corresponding to a first advertisement rate; detecting, via the circuitry, a presence or absence of the one or more electronic devices within communication range of the device based on a detection signal received from at least one of the one or more electronic devices; and modifying, via the circuitry, the predetermined advertisement rate to correspond to a second advertisement rate based on the presence or absence of the one or more electronic devices.

In another exemplary implementation, advertising beacon includes circuitry configured to transmit advertisement data to one or more scanning devices at a first advertisement rate, detect a presence or absence of the one or more electronic devices within a Bluetooth Low Energy (BLE) communication range of the device based on a detection signal received from at least one of the one or more scanning devices, and modify the predetermined advertisement rate to correspond to a second advertisement rate based on the presence or absence of the one or more scanning devices.

Aspects of the present disclosure are directed to devices and methods for controlling an advertisement rate of an advertising device, such as a Bluetooth Low Energy (BLE) advertising beacon. In some implementations, advertising beacons are configured with batteries that are designed to operate for long periods of time, such as months or years. For example, BLE advertising beacons can be installed in medical devices such as pacemakers and drug pumps that are implanted within a patient's body and are configured to operate for years. However, transmitting data at a single advertisement rate regardless of whether a scanning device is within communication range of the advertising beacon and capable of receiving the advertisement data can lead to premature draining of the batteries. Controlling the advertisement rate of transmissions output from the advertising beacons based on whether or not there are scanner devices within communication range of the advertising beacon can extend the life of the batteries, which ensures that power to the advertising beacons is not unexpectedly or prematurely lost. Throughout the disclosure, the advertising beacons can be interchangeably referred to as advertising devices, advertisers, or ADVs.

Figure 1:
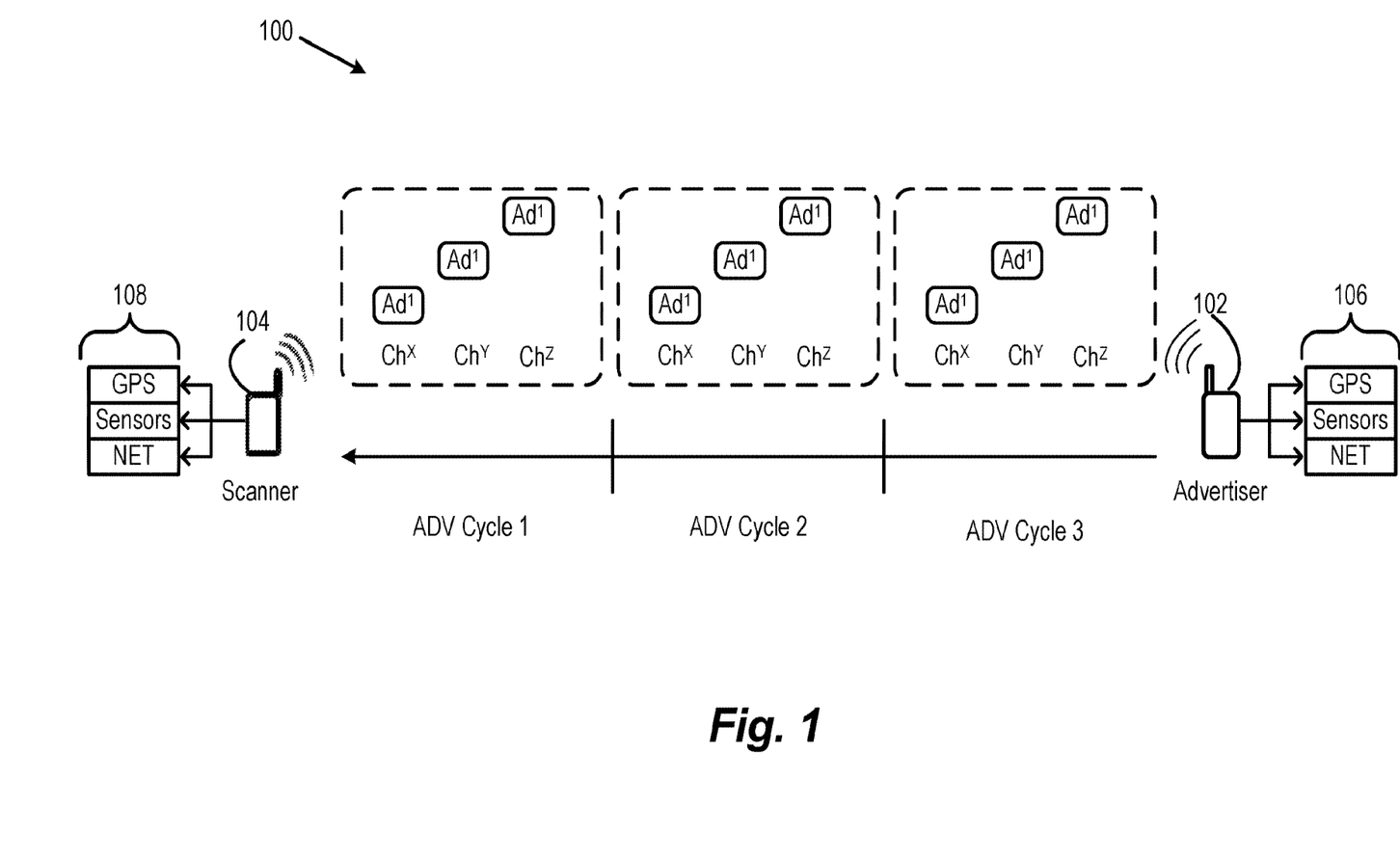
FIG. 1 is an exemplary illustration of a Bluetooth Low Energy (BLE) communication system, according to certain embodiments.

FIG. 1 is an exemplary illustration of a Bluetooth Low Energy (BLE) communication system 100, according to certain embodiments. The BLE communication system 100 includes an advertiser (ADV) 102 representing at least one advertiser that is configured to transmit advertisement data $Ad^1$ to a scanner (SCN) 104 representing at least one scanning device at a predetermined advertisement rate. The ADV 102 can be any type of advertising beacon or device that can be configured to transmit the advertisement data $AD^1$ to the SCN 104 through a BLE network. For example, the ADV 102 can be a mobile device, pet tag, medical device, car tracking device, or the like. The SCN 104 can be any type of electronic device that can be configured to receive BLE signals, such as a mobile device or laptop of a shopper, pet owner, medical professional, or car owner.

In one example where the ADV 102 is configured to transmit the advertisement data $AD^1$ associated with stores within a shopping mall or neighborhood to mobile devices of shoppers within the vicinity, the advertisement data $Ad^1$ includes advertisements or store information for one or more merchants within a predetermined range of the ADV 102. The advertisements and store information may be stored in memory of the ADV 102 and transmitted at the predetermined advertisement rate. The advertisement data $AD^1$ can also include network data, positioning data, or sensor data detected by one or more sensors 106 and associated circuitry of the ADV 102. In an example where the ADV 102 is part of a pet tag, the ADV 102 can include a Global Positioning System (GPS) receiver that detects a position of the pet tag, and the ADV 102 transmits the GPS information as the advertisement data $AD^1$ to the SCN 104, which may be a mobile device of a pet owner. The SCN 104 also includes sensor data processing circuitry 108 configured to receive and process the advertisement data $Ad^1$ associated with the one or more sensors 106.

In some implementations, the ADV 102 transmits the advertisement data $AD^1$ within advertisement cycle time intervals (e.g., ADV Cycle 1, ADV Cycle 2, ADV Cycle 3, etc.) that correspond to the predetermined advertisement rate. In addition, the advertisement data $AD^1$ can be transmitted on one or more transmission channels (e.g., $Ch^X$, $Ch^Y$, $Ch^Z$, etc.) that correspond to allocated BLE communication channels. The advertisement transmissions on each of the transmission channels $Ch^X$, $Ch^Y$, $Ch^Z$ can be assigned a predetermined time frame within the advertisement cycles ADV Cycle 1, ADV Cycle 2, ADV Cycle 3. In some examples, the ADV 102 transmits the advertisement data $AD^1$ at the predetermined advertisement rate independent of whether or not the SCN 104 is within communication range and able to receive the advertisement data $AD^1$, which can lead to premature draining of the battery of the ADV 102.

In some examples, the advertisement rate of the ADV 102 can be modified based on configuration messages received from an admin scanner, which is a control device that may be the SCN 104 or another scanner within communication range of the ADV 102 that controls the advertisement rate or other operations of the ADV 102. In some aspects, the admin scanner may be co-located with the ADV 102 in an electronic device. The admin scanner can be configured to detect the presence or absence of one or more additional scanners within communication range of the ADV 102 and transmit the configuration messages to the ADV 102 to modify the advertisement rate based on the presence or absence of the scanners. For example, the admin scanner can transmit a configuration message to the ADV 102 to reduce the advertisement rate or stop transmitting the advertisement data $AD^1$ when no SCNs 104 are detected within communication range of the ADV 102.

Figure 2A:
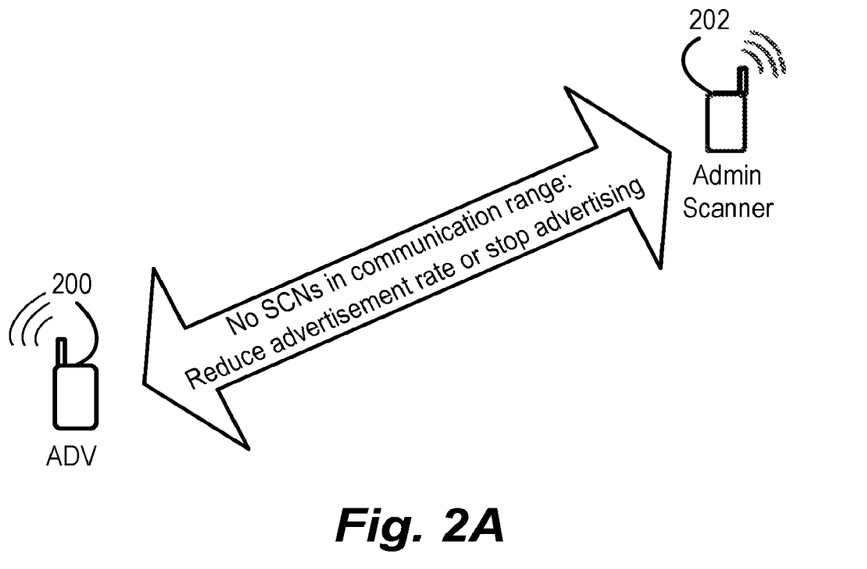
FIG. 2A is an exemplary illustration of communications between an advertiser and an admin scanner, according to certain embodiments.

For example, FIG. 2A is an exemplary illustration of communications between an ADV 200 and an admin scanner 202 with no additional SCNs present within communication range of the ADV 200, according to certain embodiments. When the admin scanner 202 determines that no additional SCNs are present within communication range of the ADV 202, the admin scanner 202 can transmit the configuration message to the ADV 200 to reduce the advertisement rate or stop advertising. The admin scanner 202 can transmit the configuration message in a predetermined format that corresponds to message formats associated with a BLE messaging protocol. For example, the admin scanner 202 can send a connect request (CONN_REQ) message to the ADV 200 to indicate that the ADV 200 can reduce the advertisement rate or stop advertising because no SCNs are within communication range of the ADV 200. The CONN_REQ message can include a modified advertisement rate as well as a type of advertisement data (e.g., store advertisement data, sensor data, positioning data, etc.) to be sent by the ADV 200. In response to receiving the CONN_REQ message from the admin scanner 202, the ADV 200 can output a connect response (CONN_RES) message that acknowledges the CONN_REQ message and indicates to the admin scanner 202 that the ADV 200 has reduced the advertisement rate or stopped advertising. The admin scanner 202 can also send a scan request (SCN_REQ) message to the ADV 200 that includes the modified advertisement rate as well as the type of data to be sent by the ADV 200 in one or more proprietary headers of the message. In response to receiving the SCN_REQ message from the admin scanner 202, the ADV 200 can output a scan response (SCN_RSP) to acknowledge the advertisement rate modification.

In one example, the ADV 200 transmits the advertisement data at a modified advertisement rate for a predetermined amount of time or a predetermined number of transmission cycles after acknowledging the CONN_REQ message. For example, the ADV 200 may transmit the advertisement data at the reduced rate for ten transmission cycles or for ten minutes and then reverts back to a default advertisement rate. In some implementations, the CONN_REQ message received by the ADV 200 indicates the amount of time or the number of transmission cycles for the ADV 200 to transmit the advertisement data at the modified advertisement rate.

In some implementations, the admin scanner 202 transmits the configuration message to the ADV 200 to reduce the advertisement rate or stop advertising when other predetermined criteria are met. For example, in examples where the ADV 200 is part of a pet tag or wearable device, then the admin scanner 202 can transmit the configuration message to reduce or stop the advertisement rate when a distance between the ADV 200 and the admin scanner 202 is less than a predetermined distance, which may indicate that a pet wearing the pet tag or the wearable device is within viewing range of the owner. Also, the ADV 200 may also reduce the advertisement rate when a relative speed between the ADV 200 and the admin scanner 202 is less than a predetermined speed, which may indicate that both the ADV 200 and the admin scanner 202 are moving at similar speeds and in similar directions. Also, the ADV 200 may reduce the advertisement rate after a predetermined amount of time.

Figure 2B:
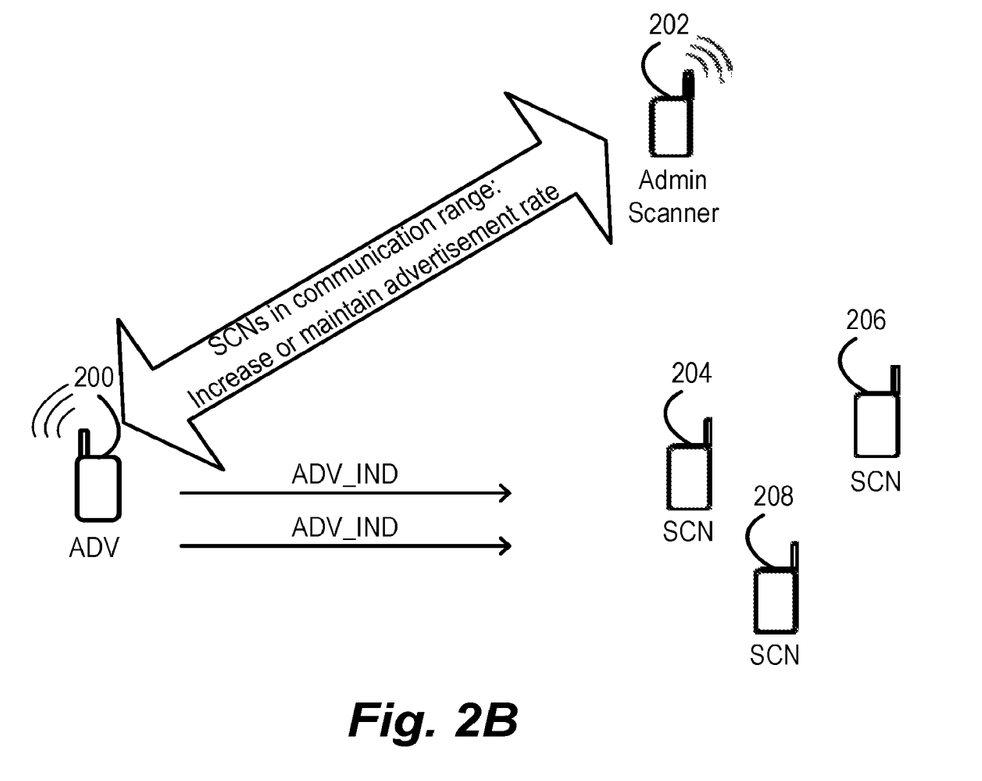
FIG. 2B is an exemplary illustration of communications between an advertiser and an admin scanner, according to certain embodiments.

In a similar way, the admin scanner 202 can transmit a configuration message to the ADV 200 to increase the advertisement rate when one or more of the SCNs are detected within the communication range of the ADV 102. For example, FIG. 2B is an exemplary illustration of communications between the ADV 200 and the admin scanner 202 with one or more additional SCNs 204, 206, and 208 within communication range of the ADV 200, according to certain embodiments. When the admin scanner 202 determines that the SCNs 204, 206, and 208 are present within communication range of the ADV 202, the admin scanner 202 transmits the CONN_REQ message or SCN_REQ message to the ADV 200 to indicate to the ADV 200 to maintain or increase the advertisement rate. In response to receiving the CONN_REQ or SCN_REQ message from the admin scanner 202, the ADV 200 can output the CONN_RES or SCN_RSP message to acknowledge the advertisement rate modification. The ADV 200 outputs the advertisement data in a predetermined message format, which can correspond to a BLE protocol messaging format, such as a connectable undirected advertising event (ADV_IND) message.

In some implementations, the advertisement rate of the ADV 200 may be based on a number of detected SCNs 204, 206, and 208. For example, the advertisement rate of the ADV 200 can be increased as the number of SCNs 204, 206, or 208 within the communication range increases. The advertisement rate of the ADV 200 may also be dynamically configurable based on learned trends in movement of the SCNs 204, 206, and 208 over time within an area surrounding the ADV 200. If the ADV 200 is positioned in a shopping mall, the admin scanner 202 may transmit messages to modify the advertisement rate of the ADV 200 based on learned patterns of shopper movement through the shopping mall throughout a day, week, month, season, year, etc. For example, the admin scanner 202 can determine the movement patterns of the shoppers carrying SCNs over time, which can be stored in memory of the admin scanner 202. In addition, the type of advertisement data transmitted by the ADV 200 can also be modified based on the learned trends of shopper movement.

In some implementations, the admin scanner 202 transmits the configuration message to the ADV 200 to increase or maintain the advertisement rate or stop advertising when other predetermined criteria are met. For example, in examples where the ADV 200 is part of a pet tag or wearable device, then the admin scanner 202 can transmit the configuration message to increase or maintain the advertisement rate when a distance between the ADV 200 and the admin scanner 202 is greater than or equal to a predetermined distance, which may indicate that a pet wearing the pet tag or the wearable device is out of viewing range of the owner. Also, the advertisement rate of the ADV 200 may be increased when a relative speed between the ADV 200 and the admin scanner 202 is greater than or equal a predetermined speed, which may indicate that the ADV 200 and the admin scanner 202 are moving at unequal speeds or in opposite directions.

Figure 3:
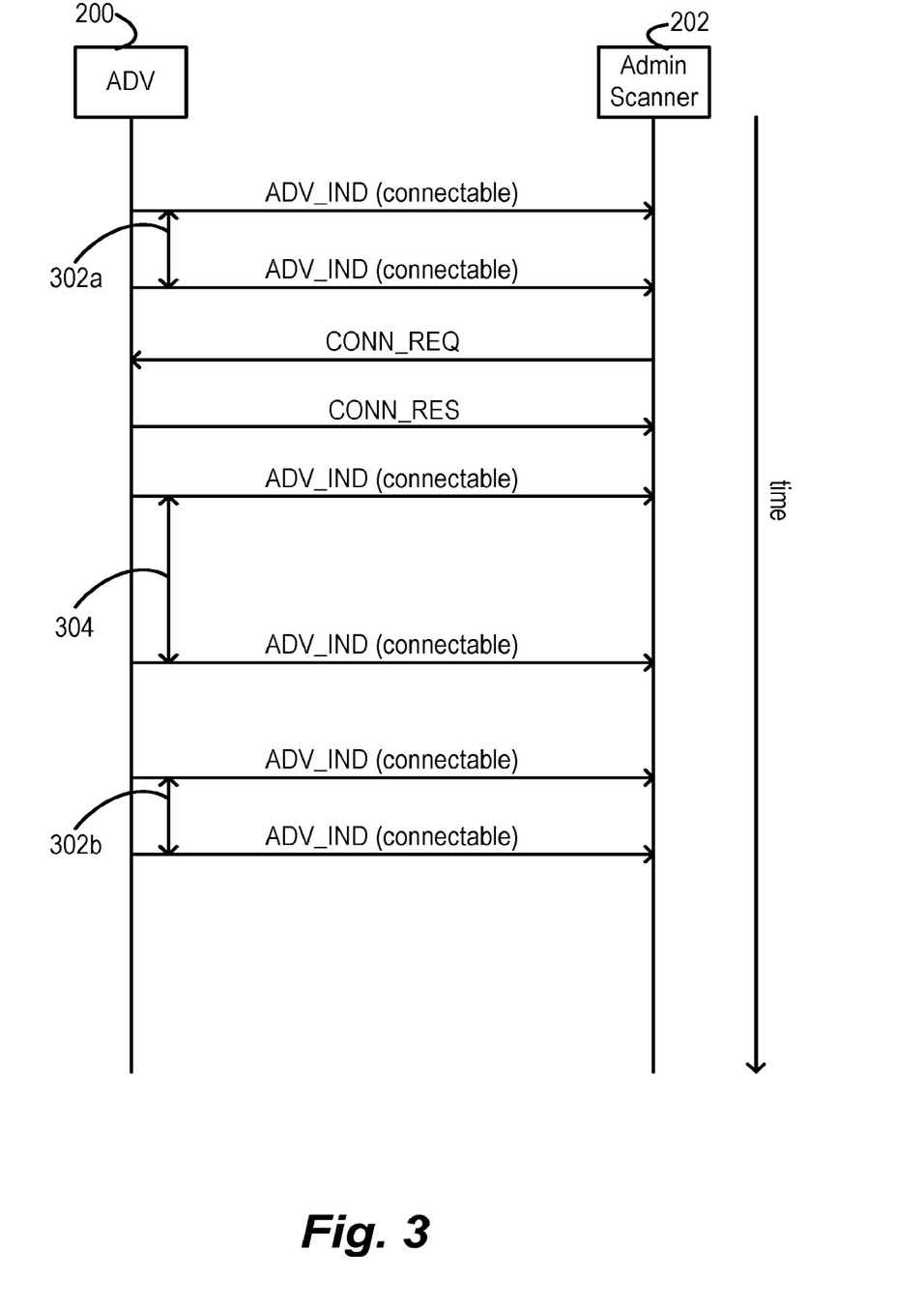
FIG. 3 is an exemplary swim lane diagram depicting communications between an advertiser and an admin scanner, according to certain embodiments.

FIG. 3 is an exemplary swim lane diagram depicting communications between the ADV 200 and the admin scanner 202, according to certain embodiments. In some examples, the admin scanner 202 can control the advertisement rate of more than one ADV 200, but the description provided herein is directed to control of one ADV 200. The ADV 200 transmits the advertisement data in an ADV_IND message to the admin scanner 202 or any other SCNs within communication range of the ADV 200 at an advertisement rate 302a that may correspond to a default advertisement rate for the ADV. The ADV_IND message may indicate the advertisement rate 302a, or the admin scanner 202 can determine the advertisement rate 302a based on a frequency with which the ADV_IND messages are transmitted.

If the admin scanner 202 detects that no SCNs are present within communication range or if one or more of the other predetermined criteria discussed previously are met, then the admin scanner 202 transmits the CONN_REQ (or SCN_REQ) message to the ADV 200 includes the modified advertisement rate as well as a type of advertisement data (e.g., advertisement data, sensor data, positioning data, etc.) to be sent by the ADV 200. In response to receiving the CONN_REQ message from the admin scanner 202, the ADV 200 can output the CONN_RES (or SCN_RSP) message to acknowledge the CONN_REQ message and indicate to the admin scanner 202 that the ADV 200 has modified the advertisement rate. In response to transmitting the CONN_RES message to the admin scanner 202, the ADV 200 transmits the advertisement data in the ADV_IND message to the admin scanner 202 or any other SCNs within communication range of the ADV 200 at a modified advertisement rate 304 that is greater than the advertisement rate 302a. In some implementations, the ADV 200 transmits the ADV_IND messages at the modified advertisement rate 304 for a predetermined amount of time or a predetermined number of transmission cycles after acknowledging the CONN_REQ message. For example, the ADV 200 may transmit the ADV_IND messages at the modified advertisement rate 304 for ten transmission cycles or for ten minutes and then reverts back to the default advertisement rate 302a.

Figure 4:
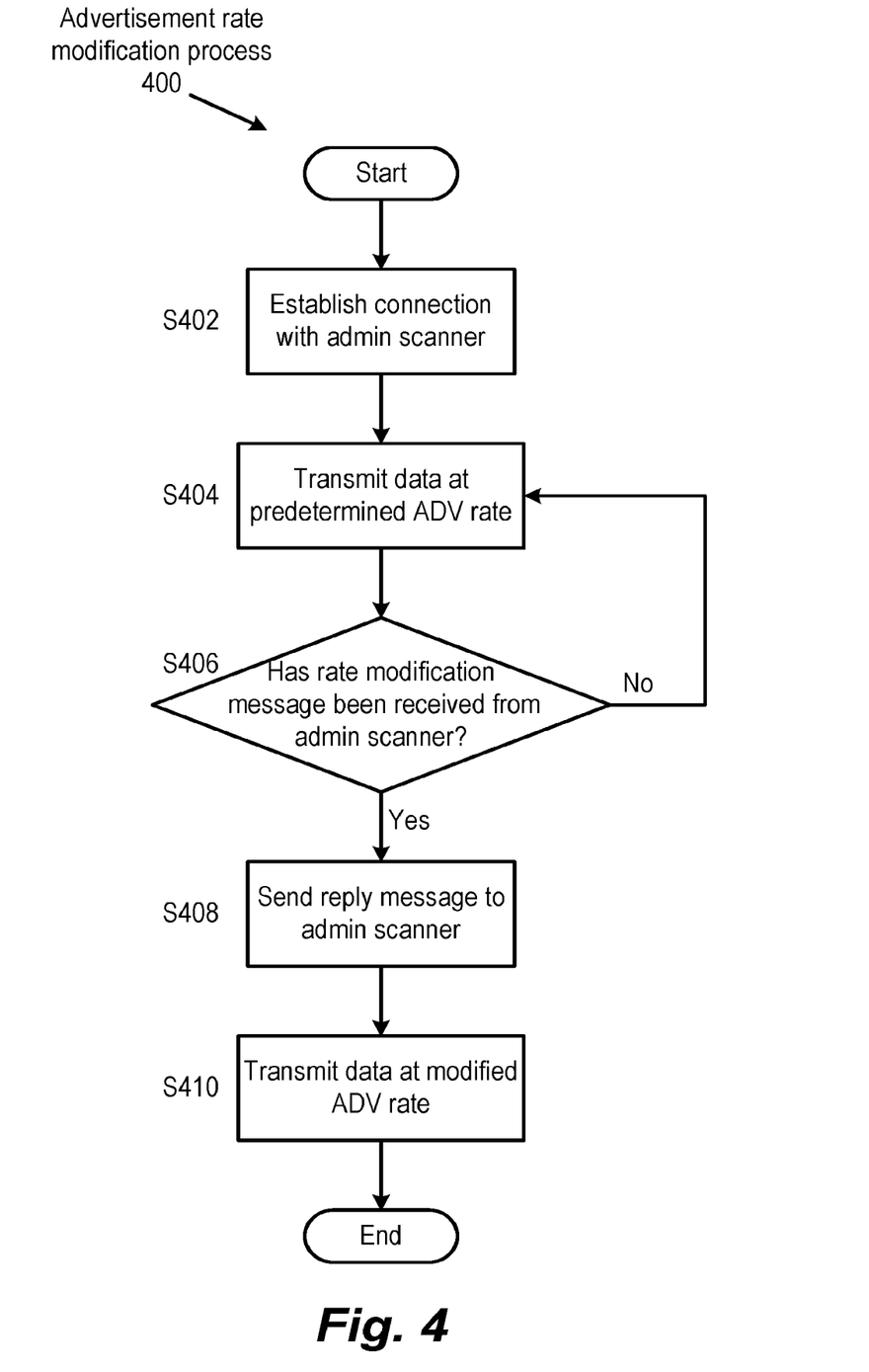
FIG. 4 is an exemplary flowchart of an advertisement rate modification process, according to certain embodiments.

FIG. 4 is an exemplary flowchart of an advertisement rate modification process 400, according to certain embodiments. The advertisement rate modification process 400 is described with respect to the ADV 200 and admin scanner 202 that are connected through a BLE network connection but can also be applied to other scanner/advertiser configurations, such as greater number of ADVs or SCNs or other types of network configurations.

At step S402, the ADV 200 establishes a network connection with the admin scanner 202, such as a BLE connection. In some implementations, the admin scanner 202 has multiple BLE connections to multiple ADVs 200 and controls the advertisement rates of the ADVs 200.

At step S404, the ADV 200 transmits the advertisement data at a predetermined advertisement rate, which may be a default advertisement rate for the ADV 200 that is stored in the memory of the ADV 200. The ADV 200 transmits the advertisement data in the ADV_IND message to the admin scanner 202 or any other SCNs within communication range of the ADV 200 at the predetermined advertisement rate. The ADV_IND message may indicate the predetermined advertisement rate, or the admin scanner 202 can determine the predetermined advertisement rate based on a frequency with which the ADV_IND messages are transmitted.

At step S406, the ADV 200 determines whether a rate modification message has been received from the admin scanner 202. In some implementations, the rate modification message is the CONN_REQ (or SCN_REQ) message sent by the admin scanner 202 that indicates a modified advertisement rate for the ADV 200. The rate modification message includes the modified advertisement rate as well as a type of advertisement data (e.g., advertisement data, sensor data, positioning data, etc.) to be sent by the ADV 200. If the admin scanner 202 detects that no SCNs are present within the communication range of the ADV 200, then the admin scanner 202 can transmit the rate modification message to reduce the advertisement rate or stop advertisement transmissions from the ADV 200. In addition, the advertisement rate of the ADV 200 can be stopped or reduced if one or more predetermined criteria are met, such as a distance between the ADV 200 and the admin scanner 202 being less than a predetermined distance, a relative speed between the ADV 200 and the admin scanner 202 being less than a predetermined speed, or a after a predetermined amount of time has passed. In a similar way, the admin scanner 202 can transmit a configuration message to the ADV 200 to increase the advertisement rate when one or more of the SCNs are detected within the communication range of the ADV 102.

If the ADV 200 determines that a rate modification message has been received from the admin scanner 202, resulting in a "yes" at step S406, then step S408 is performed. However, if the ADV 200 determines that a rate modification message has not been received from the admin scanner 202, resulting in a "no" at step S406, then the process 400 returns to step S404, and the ADV 200 continues to transmit the ADV_IND messages at the predetermined advertisement rate.

If it is determined at step S406 that a rate modification message has been received from the admin scanner 202, then at step S408, the ADV 200 transmits a reply message to the admin scanner 202 that acknowledges the rate modification message and indicates to the admin scanner 202 that the ADV 200 has modified the advertisement rate to correspond to the advertisement rate indicated in the rate modification message. In some implementations, the reply message is a CONN_RES (or SCN_RSP) message.

At step S410, the ADV 200 transmits the advertisement data in the ADV_IND message at the modified advertisement rate. In some implementations, the ADV 200 transmits the ADV_IND messages at the modified advertisement rate for a predetermined amount of time or a predetermined number of transmission cycles after acknowledging the rate modification message. For example, the ADV 200 may transmit the ADV_IND messages at the modified advertisement rate for ten transmission cycles or for ten minutes and then reverts back to the predetermined or default advertisement rate.

Figure 5A:
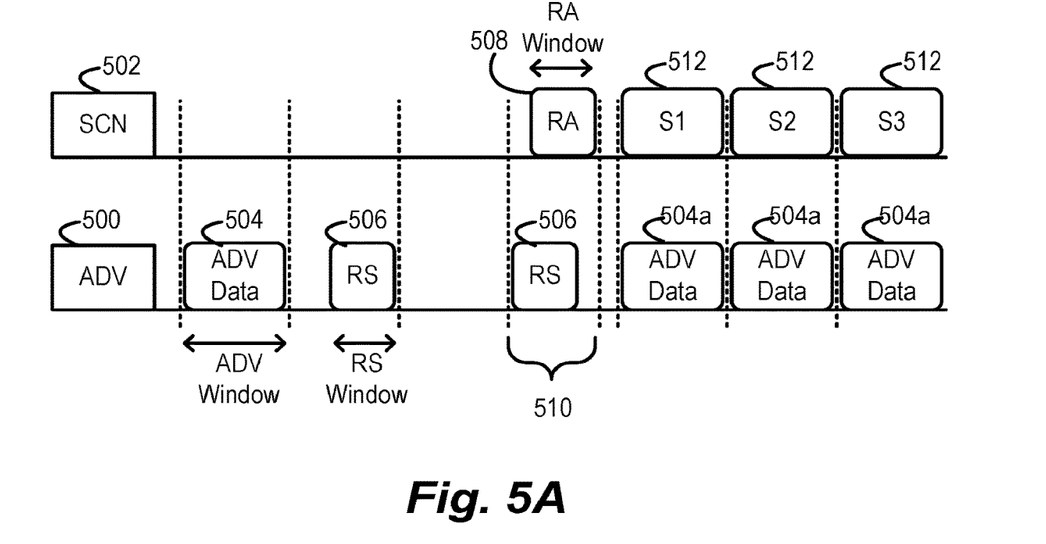
FIG. 5A is an exemplary diagram depicting a role switching process, according to certain embodiments.

FIG. 5A is an exemplary diagram depicting role switching between a SCN 502 and an ADV 500, according to certain embodiments. In some implementations, the ADV 500 can detect the presence or absence of the SCN 502 as well as other SCNs within communication range of the ADV 200 and modify the advertisement rate accordingly without receiving rate modification messages from an admin scanner. For example, the ADV 500 can periodically switch roles to function as a SCN in order to detect the presence or absence of the SCN 502. The ADV 500 transmits role switching scan (RS) signals 506 at a predetermined RS time interval that does not interfere with the advertisement data 504 that is transmitted by the ADV 500 at a predetermined advertisement rate. For example, the ADV window corresponds to a transmission time for the ADV data 504, and the RS window corresponds to a transmission time for the RS signals 506. Likewise, the SCN 502 transmits role switching advertise (RA) signals 508 at a predetermined RA time interval. For example, the RA window corresponds to the transmission time for the RA signals 508.

The RS signals 506 transmitted by the ADV 500 correspond to a scanner signal format where the ADV 500 searches to determine whether or not there are any SCNs within communication range. In one example, the ADV 500 determines that the SCN 502 is within communication range when an amount of overlap is detected between the RS window of the RS signal 506 and the RA window of the RA signal 508 transmitted by the SCN 502. If the RS window and the RA window do not overlap, then the ADV 500 may determine that there are no SCNs within the communication range of the ADV 500. If overlap between the RS signal 506 and RA signal 508 has not been detected after a predetermined number of RS signals 506 have been transmitted, then the ADV 500 may reduce the advertisement rate of the ADV data 504 or may stop transmitting the ADV data 504 until overlap is detected between the RS signal 506 and the RA signal 508.

Figure 5B:
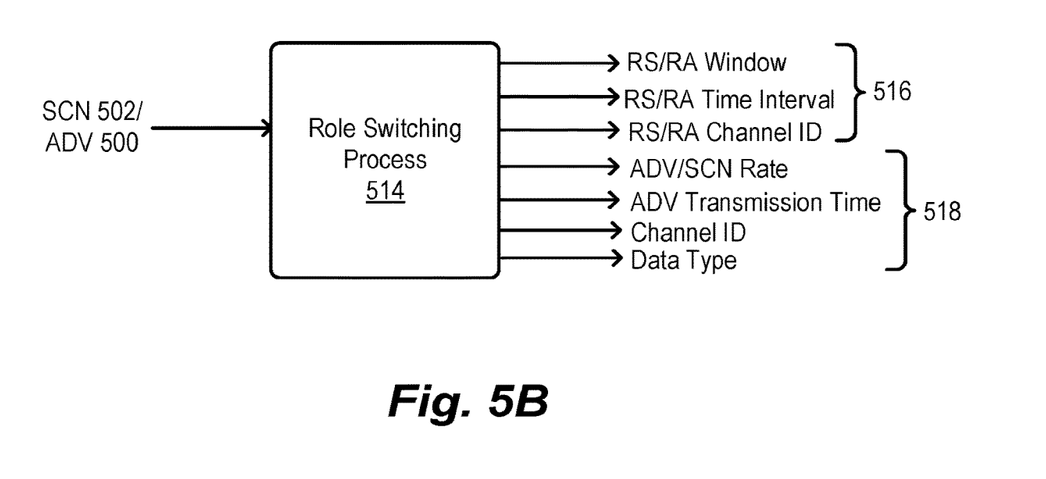
FIG. 5B is an exemplary diagram of configuration parameters of an advertiser and scanner in a role switching process, according to certain embodiments.

If overlap exists between the RS signal 506 and the RA signal 508 such as during time interval 510, then the ADV 500 and the SCN 502 can exchange and negotiate configuration parameters that allow ADV 500 and SCN 502 to synchronize the RS signals 506 with the RA signals 508 as well as synchronize the ADV data 504 transmitted by the ADV 500 with one or more scanning periods 512 during which the SCN 502 receives the ADV data 504. For example, FIG. 5B is an exemplary diagram of configuration parameters exchanged between the ADV 500 and the SCN 502 during a role switching process 514, according to certain embodiments. The configuration parameters exchanged between the ADV 500 can include role switching configuration parameters 516 as well as advertisement configuration parameters 518.

The role switching configuration parameters 516 can include RS/RA windows that correspond to transmission times for the RS signals 506 and RA signals 508, RS/RA time intervals that correspond to the rates at which the RS signals 506 and RA signals 508 are transmitted, and RS/RA channel IDs which indicate the channels on which the RS signals 506 and RA signals 508 are transmitted. Based on the exchanged role switching configuration parameters 516, the ADV 500 and the SCN 502 can perform a negotiation to ensure that the RS signals 506 and RA signals 508 overlap with one another. For example, the ADV 500 can modify the RS window, RS time interval, and/or RS channel ID to correspond to the RA window, RA time interval, and/or RA channel ID. Similarly, the SCN 502 can modify the RA window, RA time interval, and/or RA channel ID to correspond to the RS window, RS time interval, and/or RS channel ID.

In addition, the advertisement configuration parameters 518 can include the predetermined advertisement rate for the ADV data 504, a scanning period length during which the SCN 502 is configured to receiving the ADV data 504, the ADV window that corresponds to the transmission time of the ADV data 504, channel IDs for the ADV data 504 transmissions and the scanning periods 512, as well as a type of ADV data (e.g., store advertisement data, sensor data, positioning data, etc.). Based on the exchanged advertisement configuration parameters 518, the ADV 500 and the SCN 502 can perform a negotiation to ensure that the ADV data transmissions and the SCN periods 512 are synchronized as shown by the ADV data transmissions 504a and the SCN periods 512 in FIG. 5A. For example, the ADV 500 can modify the advertisement rate for the ADV data 504, ADV data 504 transmission time, ADV channel ID, and/or ADV data type to correspond to the scanning period length, RA time interval, and/or RA channel ID. Similarly, the SCN 502 can modify the scanning period length 512, and/or channel ID to correspond to advertisement rate for the ADV data 504, ADV data 504 transmission time, and/or ADV channel ID.

Figure 6:
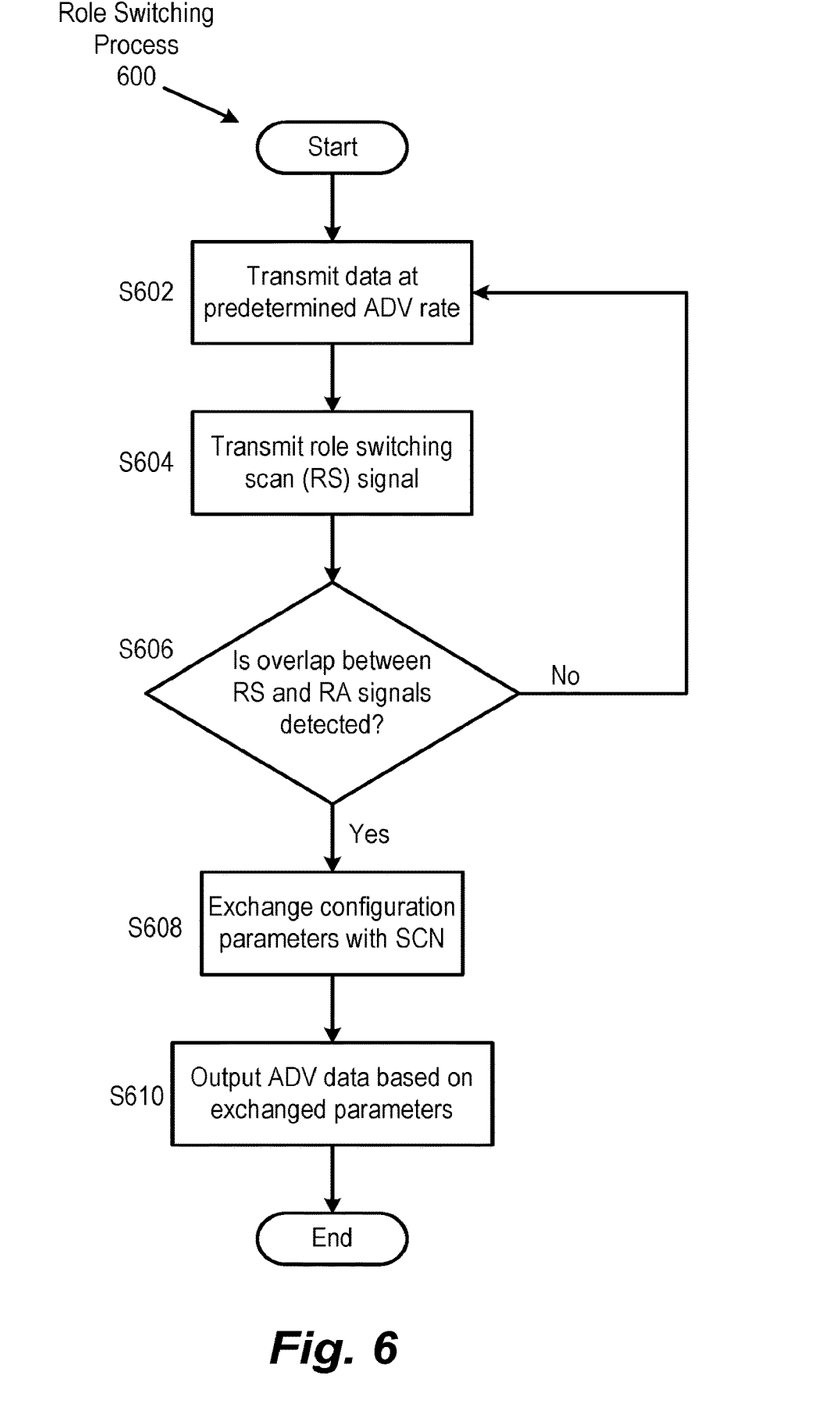
FIG. 6 is an exemplary flowchart of a role switching process, according to certain embodiments.

FIG. 6 is an exemplary flowchart of role switching process 600, according to certain embodiments. The role switching process 600 is described with respect to the ADV 500 and SCN 502 that are connected through a BLE network connection but can also be applied to other scanner/advertiser configurations, such as greater number of ADVs or SCNs or other types of network configurations.

At step S602, the ADV 500 transmits ADV data 504 at a predetermined advertisement rate, which may be a default advertisement rate for the ADV 500 that is stored in the memory of the ADV 500. The ADV 500 can transmit the ADV data 504 in the ADV_IND message to SCN 502 or any other SCNs within communication range of the ADV 500 at the predetermined advertisement rate but other messaging formats can also be used.

At step S604, the ADV 500 transmits role switching scan (RS) signals 506 at a predetermined RS time interval that does not interfere with the advertisement data 504 that is transmitted by the ADV 500 at a predetermined advertisement rate. As shown in FIG. 5A, the ADV window corresponds to a transmission time for the ADV data 504, and the RS window corresponds to a transmission time for the RS signals 506. Likewise, the SCN 502 transmits the RA signals 508 at a predetermined RA time interval, and the RA window corresponds to the transmission time for the RA signals 508.

At step S606, the ADV 500 determines whether overlap is detected between the RS signal 506 and the RA signal 508. In one example, the ADV 500 determines that the SCN 502 is within communication range when an amount of overlap is detected between the RS window of the RS signal 506 and the RA window of the RA signal 508 transmitted by the SCN 502. If the RS window and the RA window do not overlap, then the ADV 500 may determine that there are no SCNs within the communication range of the ADV 500. If the ADV 500 determines that overlap exists between the RS signal 506 and the RA signal 508, resulting in a "yes" at step S606, then step S608 is performed.

Otherwise, if the ADV determines that the RS signal 506 and the RA signal 508 do not overlap, resulting in a "no" at step S66, then the process 600 returns to step S602, and the ADV 500 continues to output the ADV data 504 at the predetermined advertisement rate. In some implementations, if overlap between the RS signal 506 and RA signal 508 has not been detected after a predetermined number of RS signals 506 have been transmitted, then the ADV 500 may reduce the advertisement rate of the ADV data 504 or may stop transmitting the ADV data 504 until overlap is detected between the RS signal 506 and the RA signal 508.

If overlap between the RS signal 506 and the RA signal 508 is detected, then at step S608, the ADV 500 exchanges configuration parameters with the SCN 502 that can include role switching configuration parameters 516 as well as advertisement configuration parameters 518. The role switching configuration parameters 516 can include RS/RA windows that correspond to transmission times for the RS signals 506 and RA signals 508, RS/RA time intervals that correspond to the rates at which the RS signals 506 and RA signals 508 are transmitted, and RS/RA channel IDs which indicate the channels on which the RS signals 506 and RA signals 508 are transmitted. The advertisement configuration parameters 518 can include the predetermined advertisement rate for the ADV data 504, a scanning period length during which the SCN 502 is configured to receiving the ADV data 504, the ADV window that corresponds to the transmission time of the ADV data 504, channel IDs for the ADV data 504 transmissions and the scanning periods 512, as well as a type of ADV data (e.g., store advertisement data, sensor data, positioning data, etc.). The exchanged configuration parameters can be used by the ADV 500 and/or SCN 502 to synchronize the RS signals 506 with the RA signals 508 as well as synchronize the ADV data 504 transmitted by the ADV 500 with one or more scanning periods 512 during which the SCN 502 receives the ADV data 504.

At step S610, the ADV 500 outputs the ADV data 504a based on the configuration parameters exchanged with the SCN 502. Based on the exchanged advertisement configuration parameters 518, the ADV 500 and the SCN 502 can perform a negotiation to ensure that the ADV data transmissions and the SCN periods 512 are synchronized as shown by the ADV data transmissions 504a and the SCN periods 512 in FIG. 5A. For example, the ADV 500 can modify the advertisement rate for the ADV data 504, ADV data 504 transmission time, ADV channel ID, and/or ADV data type to correspond to the scanning period length, RA time interval, and/or RA channel ID. Similarly, the SCN 502 can modify the scanning period length 512, and/or channel ID to correspond to advertisement rate for the ADV data 504, ADV data 504 transmission time, and/or ADV channel ID.

Figure 7:
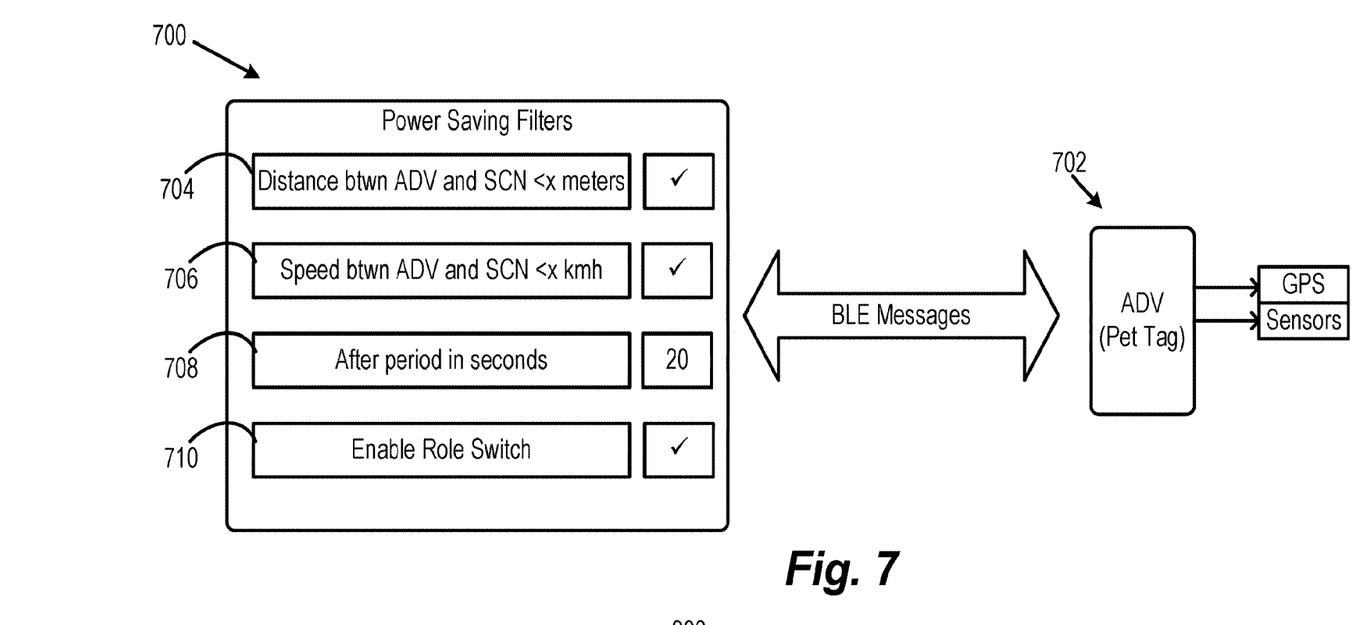
FIG. 7 is an exemplary diagram of a user interface for configuring an advertiser, according to certain embodiments.

FIG. 7 is an exemplary diagram of a user interface (UI) 700 for configuring an ADV 702 that may be included as part of a pet tag, which can be used to track a location of a pet. The UI 700 can be displayed on a screen of a mobile phone of a pet owner, and the mobile phone can function as a SCN or admin scanner that communicates with the ADV 702 via BLE messages. The UI 700 includes one or more power saving filters that indicate manually configurable parameters associated with a modified advertisement rate by the ADV 702. A user can select or deselect one or more of the power saving filters based on a desired functionality of the ADV 702. One or more of the power saving filters may be associated with the advertisement rate modification process 400, which can include but are not limited to a distance filter 704, a speed filter 706, or a time filter 708. The distance filter 704 indicates a greatest distance between an admin scanner and the ADV 700 when the admin scanner transmits a configuration message to the ADV 700 to reduce the advertisement rate or stop advertising when a distance between the ADV 700, which may indicate that a pet wearing the pet tag or the wearable device is within viewing range of the owner. With the speed filter 706, the ADV 700 may reduce the advertisement rate when a relative speed between the ADV 700 and the admin scanner is less than a predetermined speed. A relative speed that is less than the predetermined speed may indicate that both the ADV 700 and the admin scanner are moving at similar speeds and in similar directions, such as when a pet wearing the pet tag is being walked on a leash by an owner carrying a mobile device that is operating as the admin scanner. Also, the time power saving filter 708 indicates an amount of time after which the ADV 700 may reduce the advertisement rate or stop advertising. The UI 700 may also include a power saving filter 710 associated with the role switching process 600 where user can select an "enable role switch" selection that allows the mobile device operating as a scanner to interact with the ADV 700 in accordance with the role switching process 600 described previously.

Figure 8:
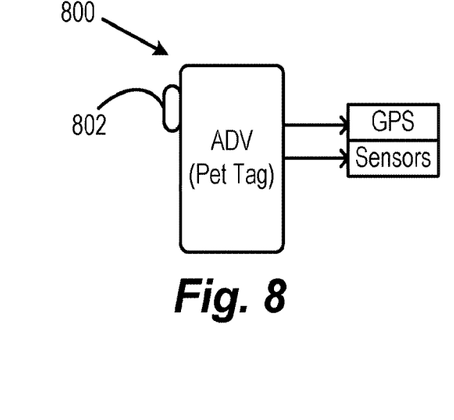
FIG. 8 is an exemplary illustration of an advertiser, according to certain embodiments.

FIG. 8 is an exemplary illustration of an ADV 800 with a switch 802, according to certain embodiments. Activating the switch 802 enables the ADV 800 to be configured to perform the role switching process 600 described previously. In some implementations, the switch 802 can be manually activated by any type of switch activation mechanism, such as a button, knob, etc.

Figure 9:
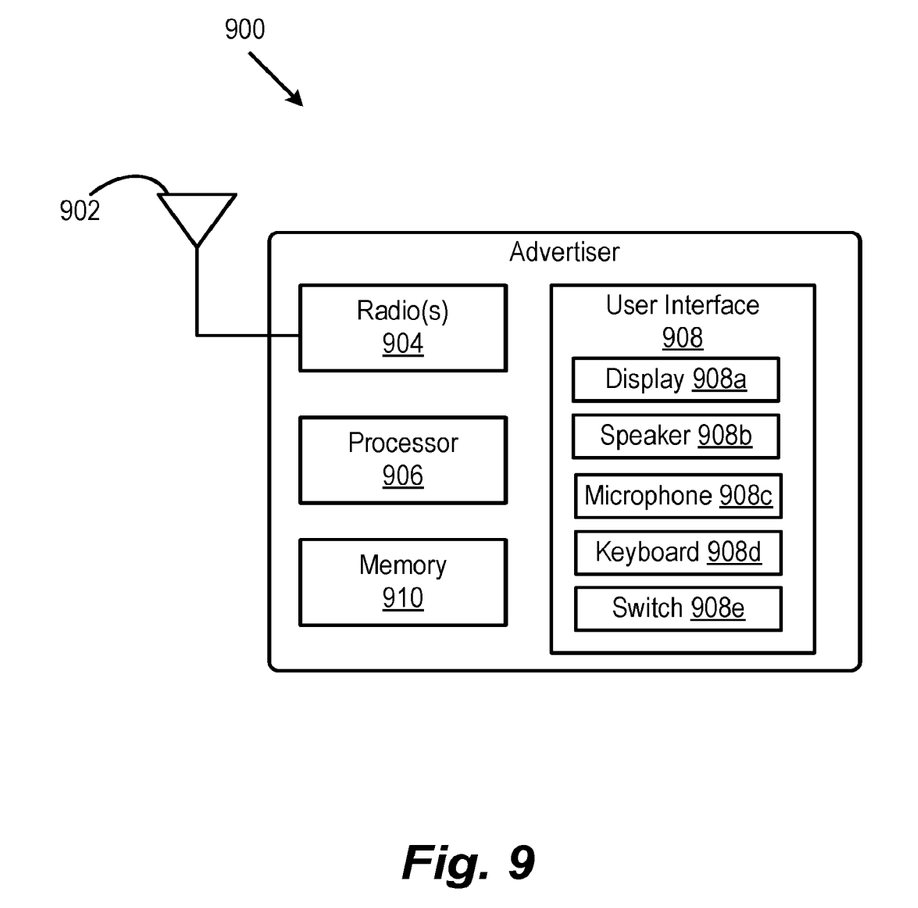
FIG. 9 is an exemplary hardware block diagram of an advertiser, according to certain embodiments.

FIG. 9 is an exemplary hardware block diagram of an advertiser 900, according to certain embodiments. The advertiser 900 can be implemented as any of the ADVs described herein, such as the ADV 200, 500, or 702. The hardware components described herein with respect to the advertiser 900 are not meant to be limiting, and the advertiser 900 can include other components than those described herein. For example, the electrical components of the advertiser 900 may receive power from a coin-cell battery that is configured to operate for one or more years.

The advertiser 900 includes at least one antenna 902, one or more radios 904, a processor 906, a user interface 908, and a memory 910. The user interface 908 may include a display 908a, a speaker 908b, a microphone 908c, a keyboard 908d, and a switch 908e.

The one or more radios 904 can be a BLE radio and other radios associated with other communication networks that allow the advertiser 900 to communicate with scanning devices and may include a BLE transceiver with suitable logic, circuitry, interfaces and/or code that may be configured to transmit and/or receive signals over Bluetooth low energy air interface and communicate with the processor 906 for further processing.

The processor 906 includes suitable logic, circuitry, interfaces and/or code that may be enabled to perform a variety of signal processing tasks associated with the radios 904, such as executing one or more software processes associated with the advertisement rate modification process 400 or the role switching process 600. For example, the processor 906 controls the advertisement rate of the BLE radio by processing received rate modification messages from an admin scanner and modifying the advertisement rate of the BLE signals based on the rate modification messages. The processor 906 also controls the transmission of the RS signals, determines whether overlap exists between the RS signals and RA signals sent by a scanner, exchanges configuration data with the scanner, and outputs advertisement data based on the exchanged configuration parameters.

The user interface 908 may include suitable logic, circuitry, interfaces and/or code that may be enabled to service the advertiser 900 via entering user inputs and/or presenting various services to users. The user interface 908 may optionally include associated components such as the display 908a, the speaker 908b, the microphone 908c, the keyboard 908d, and switch 908e. The display 908a may enable presentation or display graphics and/or text to users. BLE signals received or transmitted via the radios 904 may be presented to users as image data on the display 908a and/or as voice via the speaker 908b, for example, by pressing the keyboard 908d and/or generating an audio indication through the microphone 908c. The switch 908e may have an associated activation mechanism that allows a user to manually enable the advertiser 900 to perform the role switching process 600.

The memory 910 may include suitable logic, circuitry, interfaces and/or code that may enable storage of data and/or other information utilized by the processor 906. For example, the memory 908 may be utilized to store a default advertisement rate, RS signal configuration parameters, predetermined signal formats for the rate modification message and rate modification reply, and the like. The memory 910 may be enabled to store executable instructions for controlling the advertisement rate of the advertiser 900. The memory 910 may be enabled to store algorithms associated with the advertisement rate modification process 400 and the role switching process 600. The memory 910 may include RAM, ROM, low latency nonvolatile memory such as flash memory and/or other suitable electronic data storage capable of storing data and instructions.

Figure 10:
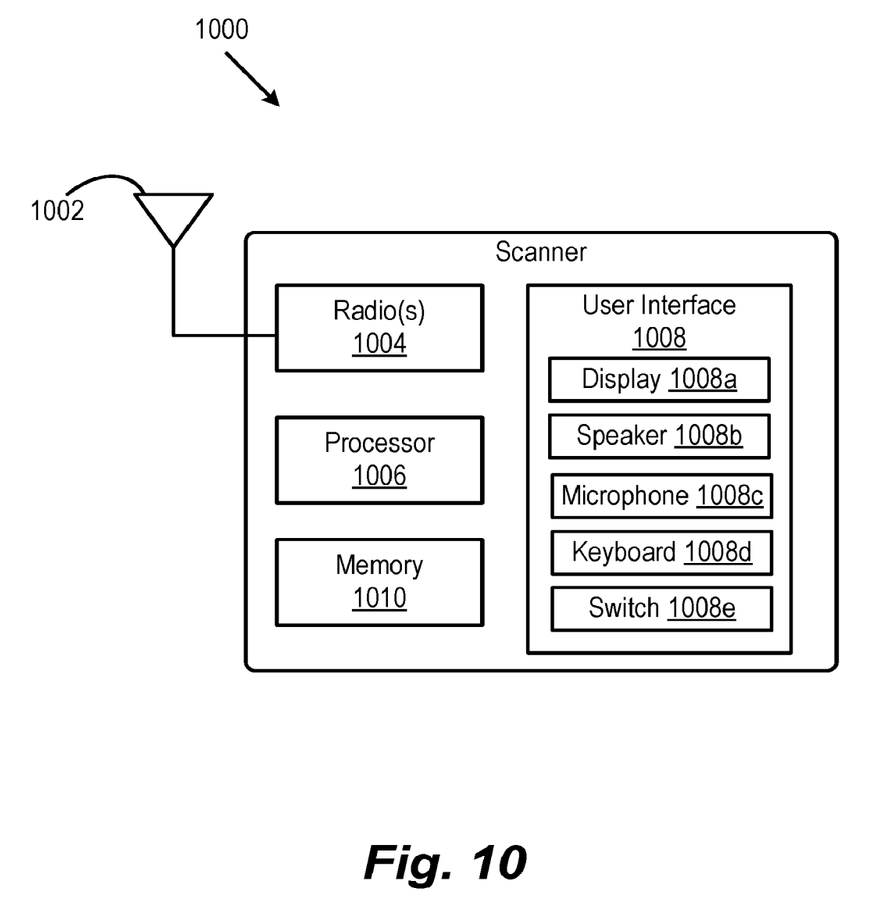
FIG. 10 is an exemplary hardware block diagram of a scanner, according to certain embodiments.

FIG. 10 is an exemplary hardware block diagram of an scanner 1000, according to certain embodiments. The scanner 1000 can be implemented as any of the ADVs described herein, such as the admin scanner 202, SCNs 204, 206, and 208, or SCN 502. The hardware components described herein with respect to the scanner 1000 are not meant to be limiting, and the scanner 1000 can include other components than those described herein.

The scanner 1000 includes at least one antenna 1002, one or more radios 1004, a processor 1006, a user interface 1008, and a memory 1010. The user interface 1008 may include a display 1008a, a speaker 1008b, a microphone 1008c, and a keyboard 1008d.

The one or more radios 1004 can be a BLE radio and other radios associated with other communication networks that allow the scanner 1000 to communicate with advertising devices and may include a BLE transceiver with suitable logic, circuitry, interfaces and/or code that may be configured to transmit and/or receive signals over Bluetooth low energy air interface and communicate with the processor 1006 for further processing.

The processor 1006 includes suitable logic, circuitry, interfaces and/or code that may be enabled to perform a variety of signal processing tasks associated with the radios 1004, such as executing one or more software processes associated with the advertisement rate modification process 400 or the role switching process 600. For example, the processor 1006 of an admin scanner determines a number of scanners within communication range of an advertiser and controls the transmission of rate modification messages to the advertiser. The processor 1006 also controls the transmission of the RA signals, exchanges configuration data with the advertiser, and modifies a scanning period length based on the exchanged configuration parameters.

The user interface 1008 may include suitable logic, circuitry, interfaces and/or code that may be enabled to service the scanner 1000 via entering user inputs and/or presenting various services to users. The user interface 1008 may optionally include associated components such as the display 1008a, the speaker 1008b, the microphone 1008c, and the keyboard 1008d. The display 1008a may enable presentation or display graphics and/or text to users. BLE signals received or transmitted via the radios 1004 may be presented to users as image data on the display 1008a and/or as voice via the speaker 1008b, for example, by pressing the keyboard 1008d and/or generating an audio indication through the microphone 1008c.

The memory 1010 may include suitable logic, circuitry, interfaces and/or code that may enable storage of data and/or other information utilized by the processor 1006. For example, the memory 1008 may be utilized to store learned trends in scanners over time for a predetermined area, RA signal configuration parameters, predetermined signal formats for the rate modification message, and the like. The memory 1010 may be enabled to store executable instructions for controlling the advertisement rate of the scanner 1000. The memory 1010 may be enabled to store algorithms associated with the advertisement rate modification process 400 and the role switching process 600. The memory 1010 may include RAM, ROM, low latency nonvolatile memory such as flash memory and/or other suitable electronic data storage capable of storing data and instructions.

Aspects of the present disclosure are directed to controlling an advertisement rate of BLE advertising beacons in order to reduce power losses and increase battery life. Unlike conventional advertisers that advertise at a constant rate regardless of whether or not there are any scanning devices present to receive the advertisement data, the implementations described herein allow the advertisement rate to be modified based on whether or not scanning devices are detected within communication range of the advertiser or other predetermined criteria. Reducing the advertisement rate when no scanners are detected within communication range of the advertising beacon reduces an overall power consumption of the advertising beacon.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. Additionally, an implementation may be performed on modules or hardware not identical to those described. Accordingly, other implementations are within the scope that may be claimed.

The invention claimed is:

1. A device comprising:
   circuitry configured to
   transmit advertisement data to one or more electronic devices at a predetermined advertisement rate corresponding to a first advertisement rate,
   detect a presence or absence of the one or more electronic devices within communication range of the device based on a detection signal received from at least one of the one or more electronic devices, and
   modify the predetermined advertisement rate to correspond to a second advertisement rate based on the presence or absence of the one or more electronic devices, wherein
   the circuitry is further configured to
   receive a configuration message from a control device indicating the absence of the one or more electronic devices within the communication range of the device; and
   reduce the predetermined advertisement rate in response to receiving the configuration message from the control device indicating the absence of the one or more electronic devices within the communication range of the device.

2. The device of claim 1, wherein the advertisement data includes at least one of network data, positioning data, or sensor data obtained by one or more sensors connected to the circuitry of the device.

3. The device of claim 1, wherein the circuitry is further configured to detect the presence or absence of the one or more electronic devices within communication range of the device based on a configuration message received from the control device in a predetermined message format.

4. The device of claim 3, wherein the predetermined message format for the configuration message corresponds to a Bluetooth Low Energy (BLE) communications protocol.

5. The device of claim 4, wherein the configuration message is in a connection request (CONN_REQ) message format or a scan request (SCN_REQ) message format.

6. The device of claim 3, wherein the circuitry is further configured to output a reply message to the control device in response to receiving the configuration message.

7. The device of claim 6, wherein the reply message is in a connection response (CONN_RESP) message format or a scan response (SCN_RSP) message format.

8. The device of claim 1, wherein the circuitry is further configured to transmit the advertisement data at the second advertisement rate for a predetermined amount of time or a predetermined number of advertisement transmissions.

9. The device of claim 8, wherein the circuitry is further configured to transmit the advertisement data at the first advertisement rate when the predetermined amount of time has passed or the predetermined number of advertisement transmissions have been transmitted.

10. A device comprising:
    circuitry configured to
    transmit advertisement data to one or more electronic devices at a predetermined advertisement rate corresponding to a first advertisement rate,
    detect a presence or absence of the one or more electronic devices within communication range of the device based on a detection signal received from at least one of the one or more electronic devices,
    modify the predetermined advertisement rate to correspond to a second advertisement rate based on the presence or absence of the one or more electronic devices,
    output a role switch scanning (RS) message at a first predetermined time interval,
    detect a role switch advertising (RA) message output by the one or more electronic devices at a second predetermined time interval, and
    determine that the second predetermined time interval of the detected RA message overlaps with the first predetermined time interval of the RS message.

11. The device of claim 10, wherein the circuitry is further configured to exchange configuration parameters with the one or more electronic devices including at least one of a transmission window, the predetermined advertisement rate, or a transmission channel identification.

12. The device of claim 11, wherein the circuitry is further configured to modify the predetermined advertisement rate based on the exchanged configuration parameters.

13. The device of claim 10, wherein the circuitry is further configured to output the RS message at the first predetermined time interval in response to a switch activation at the device.

14. The device of claim 1, wherein the circuitry is further configured to reduce the predetermined advertisement rate in a case that a distance between the device and one of the one or more electronic devices is less than a predetermined distance.

15. The device of claim 1, wherein the circuitry is further configured to reduce the predetermined advertisement rate in a case that a relative speed between the device and one of the one or more electronic devices is less than a predetermined speed.

16. A device comprising:
    circuitry configured to
    transmit advertisement data to one or more electronic devices at an advertisement rate corresponding to a first advertisement rate;
    receive a configuration message from a control device indicating absence of the one or more electronic devices within communication range of the device; and
    reducing the predetermined advertisement rate to correspond to a second advertisement rate in response to receiving the configuration message from the control device indicating the absence of the one or more electronic devices within the communication range of the device.

17. The device of claim 16, wherein the circuitry is further configured to transmit a role switch scanning (RS) message at a first predetermined interval.

18. The device of claim 16, wherein the circuitry is further configured to exchange configuration parameters with the one or more electronic devices including at least one of a transmission window, the predetermined advertisement rate, or a transmission channel identification.

19. The device of claim 17, wherein the circuitry is further configured to detect a role switch advertising (RA) message output by one of the one or more electronic devices at a second predetermined time interval.

20. The device of claim 19, wherein the circuitry is further configured to determine that the second predetermined time interval of the detected RA message overlaps with the first predetermined time interval.

* * * * *